UNITED STATES PATENT OFFICE.

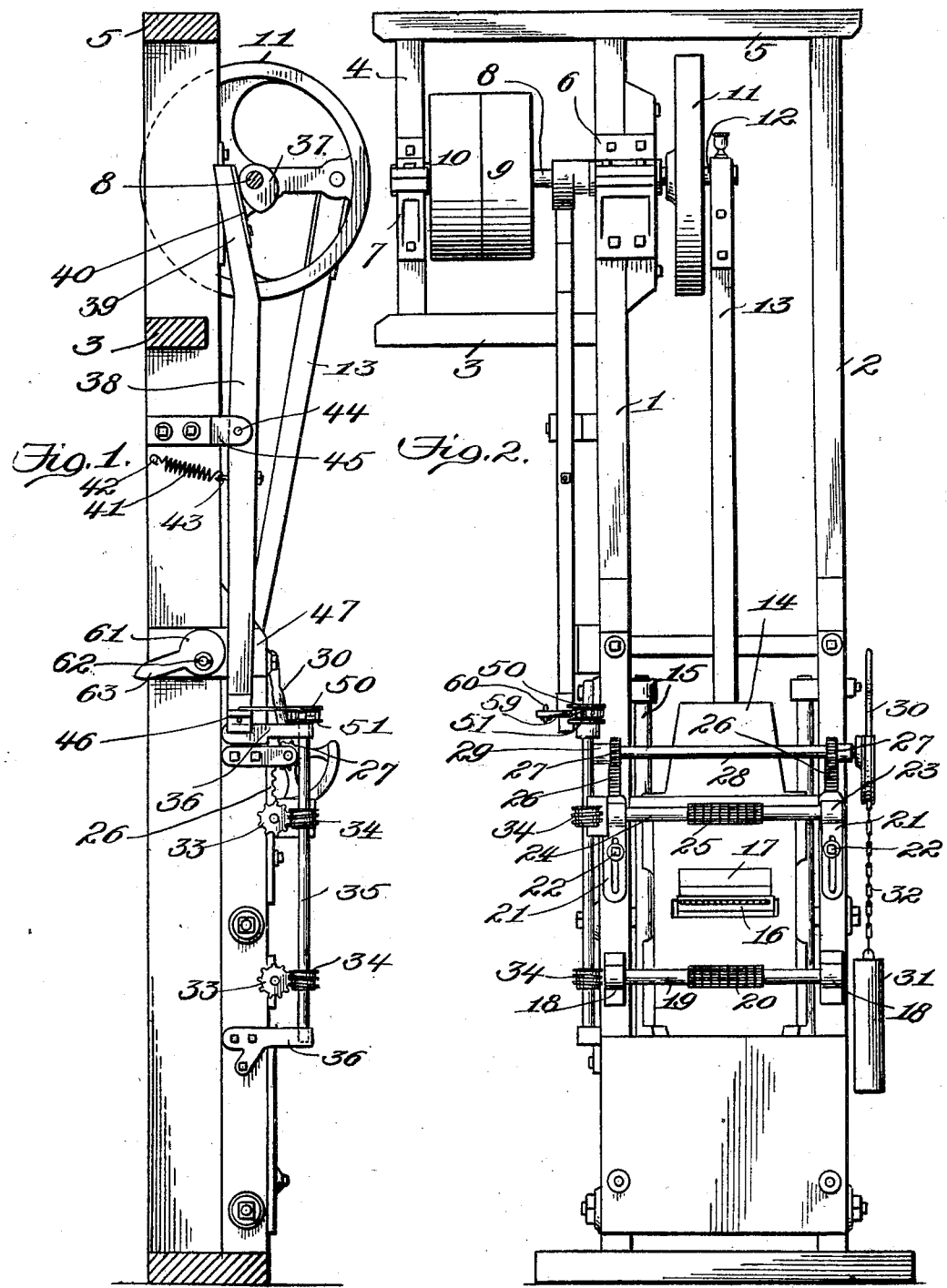

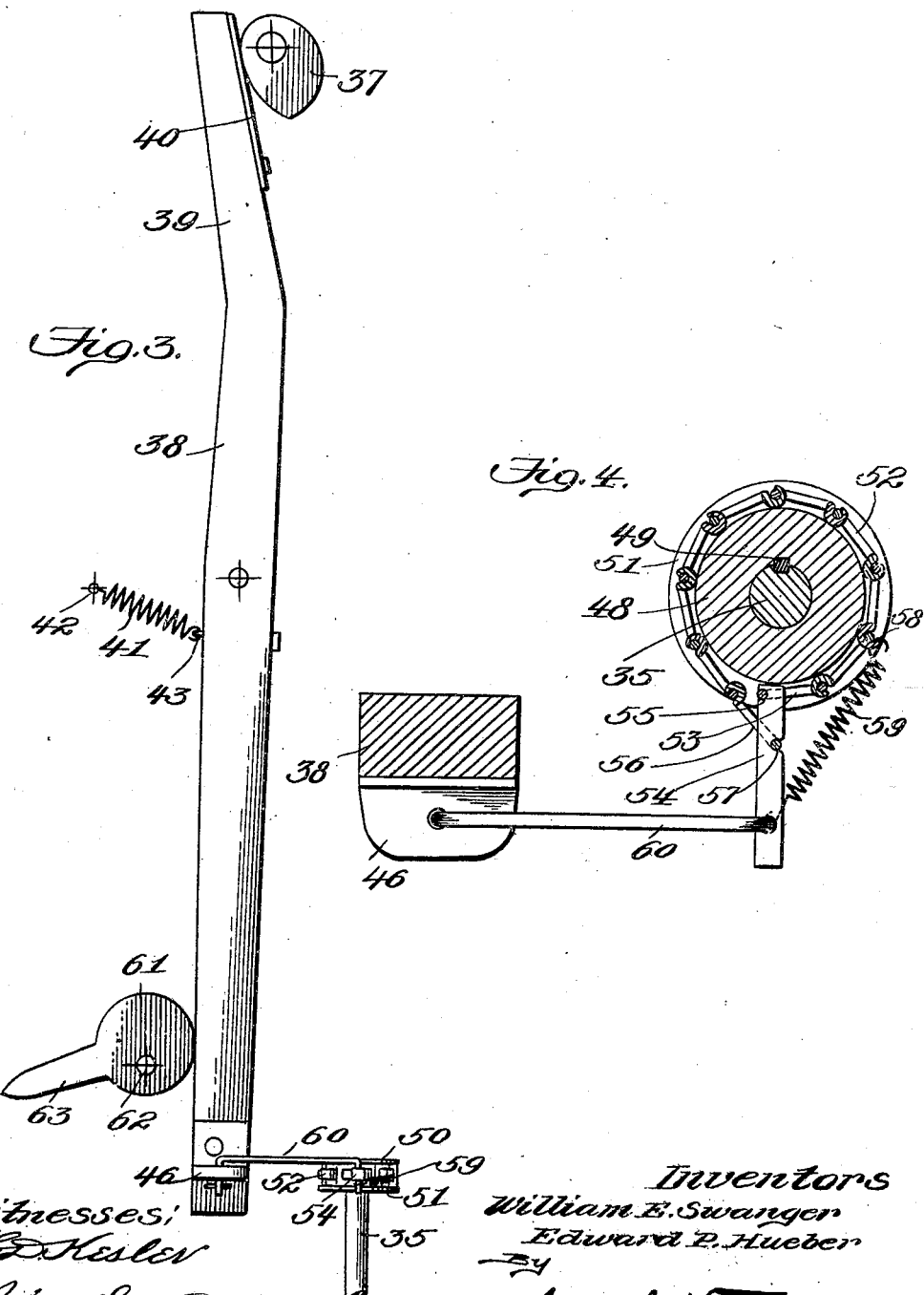

WILLIAM E. SWANGER AND EDWARD P. HUEBER, OF HACKETTSTOWN, NEW JERSEY, ASSIGNORS TO AMERICAN MACHINERY & EXPORT CO., OF HACKETTSTOWN, NEW JERSEY, A CORPORATION OF NEW JERSEY.

FEEDING MECHANISM.

No. 922,355.      Specification of Letters Patent.      Patented May 18, 1909.

Application filed January 31, 1908. Serial No. 413,643.

*To all whom it may concern:*

Be it known that we, WILLIAM E. SWANGER and EDWARD P. HUEBER, both citizens of the United States, residing at Hackettstown, in the county of Warren and State of New Jersey, have invented new and useful Improvements in Feeding Mechanism, of which the following is a specification.

This invention relates to excelsior machines, and the primary object thereof is to provide a machine of this class having an automatically operable and manually regulable feed mechanism whereby the block will be intermittently fed to the knives or cutters and wherein the stroke of the actuating means for the machine may be increased or diminished with a correspondingly increased or decreased feed of the block.

A further object of the invention is to provide a strong and durable feed mechanism for an excelsior machine wherein the use and necessity of employing a worm on the machine drive shaft and a coöperating worm gear to serve as the transmitting means for actuating the feed are overcome with the material advantage that a positive feed always ensues and frequent replacement or substitution of and for the worm and worm gear as now employed is avoided, and, further, to provide a feeding mechanism that may be regulated constantly without change of gears.

A still further object of the invention is to provide a feed mechanism for excelsior machines embodying a friction clutch for actuating means for intermittently rotating the feed rolls and dispensing with the use of a ratchet mechanism, which is disadvantageous in view of wear and limited adjustment and necessitates replacement. This class of machines is operated at a high speed and in the use of ratchet mechanism ordinarily employed wear will ensue very rapidly and an impositive operation will result and the expense of maintaining this class of machines in working order will be materially increased in view of the necessity of replacing the worn ratchet mechanism. The friction clutch substituted in the present machine for the ratchet mechanism will last indefinitely and readily adjust itself to any part of a full revolution, which is impossible in the use of a ratchet mechanism limited in accordance with the number of teeth of the ratchet.

Although a feeding mechanism in accordance with this invention is designed primarily for use in connection with excelsior machines, it will be understood that the same mechanism is adapted for any use or may form a part of any machine to which it is applicable.

With these and other objects and advantages in view, the invention consists in the construction and arrangement of the several parts which will be more fully hereinafter specified.

In the drawings: Figure 1 is a side elevation of an upright excelsior machine showing a feeding mechanism applied thereto and embodying the features of the invention. Fig. 2 is a front elevation of the machine and the feeding mechanism. Fig. 3 is a front elevation of the feeding mechanism in detail and to which the features of the invention are directed. Fig. 4 is a detail view in sectional plan of the friction clutch, the lower end of the oscillatory lever and the connection between the lever and the clutch.

The numerals 1 and 2 designate a frame uprights and projecting outwardly from the upright 1 is a horizontal supporting member 3 carrying an upright 4. The upper ends of the uprights 1, 2 and 4 are connected by a horizontal cap or cross member 5, and by this means an auxiliary frame is provided at the upper extremity of the main frame of the machine for disposing the driving mechanism in such position as to render it convenient for coöperation therewith of the particular mechanism embodying the features of the invention. Bearings 6 and 7 are respectively applied to the uprights 1 and 4, and therein is mounted the prime operating or controlling shaft 8 carrying fast and loose pulleys 9 and 10 adapted to be engaged by a belt from a prime power generating mechanism, not shown. The shaft 8 projects inwardly a suitable distance between the uprights 1 and 2 and on the end thereof between these uprights a crank wheel 11 is fixed and provided with a suitable wrist pin 12 for the attachment of the upper end of a pitman or vertical drive rod 13, the latter being attached at its lower end to a cutter head 14 reciprocatingly held by vertical guide rods 15 also supported by the uprights 1 and 2. The cutter head 14 is provided with a scoring blade 16 and a shaving knife 17 which are brought into operative relation to the block to produce the excelsior in a manner which will be readily understood.

Secured to the uprights 1 and 2 near their lower ends are bearing brackets 18 in which is mounted a lower feed shaft 19 carrying a central feed roll 20. Above the brackets 18 slotted plates 21 are held on the uprights 1 and 2 by adjusting bolts 22 and said plates have at their upper ends bearing brackets 23 for the upper feed shaft 24 which also carries a feed roll 25 similar to the roll 20. Projecting upwardly from the brackets 23 are racks 26 engaged by pinions 27 fixed on a spindle 28 journaled in brackets 29 secured on the uprights 1 and 2, the said spindle having a handle 30 at one end for shifting the same when it is desired to adjust the position of the upper feed roll 25 relatively to the lower feed roll 20 to compensate for various lengths of blocks. A counter-weight 31 is flexibly connected to the spindle 28 for instance by a chain 32 for exerting a tension on the said spindle sufficient to maintain the upper feed roll 25 in close contact with the top of the block and whereby the block is positively held between the two rolls. Each of the feed shafts 19 and 24 projects from the upright 1 and carries a worm gear 33, the said worm gears both being held in continuous mesh with worms 34 disposed at suitable distances apart on a vertically extending and intermittently rotatable feed shaft 35 journaled in brackets 36 attached to the upright 1.

The mechanism just described is well known in the art of excelsior machines and has been generally referred to to indicate the relationship of the improved features or the particular feeding mechanism embodying the features of the invention and which will now be fully specified.

The improved mechanism consists of a cam 37 fixed on the shaft 8, the said cam operating the actuating means for the feeding mechanism. The actuating means forming the essential element of the feeding mechanism consists of an oscillatory lever 38 fulcrumed at an intermediate point as at 44 to a bracket 45 extending toward the front of the machine and held by the upright 1. The upper end of the lever 38 is inclined rearwardly as at 39 and the forward inclined edge is reinforced by a wear plate 40 which is held in continual contact with the cam 37.

The cam 37 operates to force the upper end of the actuating means or lever 38 rearwardly and the lower extremity of said lever outwardly against the resistance of a spring 41 secured to the rear edge of the lever 38 below the fulcrum 44 as at 43 and also to the upright 41 as at 42. When the high side of the cam 37 traverses the upper inclined extremity of the actuating means or lever 38, the movement is regular, and as the lower side of the said cam comes around into contact with the upper extremity of the lever the spring 41 draws the said upper end of the lever in close contact with the cam or maintains a positive engagement of the lever with the cam and at the same time the lower extremity of the lever is forced rearwardly, and by this means a regular oscillation of the lever ensues without the least tendency to abruptness of movement.

To obviate lateral movement of the lower extremity of the oscillatory lever 38 and which might ensue by wear of the fulcrum, an outstanding guard or bracket 47 is provided and secured to the outer edge of the upright 1 adjacent to said lever 38. The lower end of the lever 38 is provided with a laterally extending apertured arm 46 which is connected to and coöperates with a clutch mechanism. This clutch mechanism is disposed on the upper extremity of the shaft 35 to impart an intermittent motion to said shaft and consists of a disk 48 keyed as at 49 to the shaft. The periphery of the disk 48 is grooved, thereby providing upper and lower annular flanges 50, 51 between which is disposed a gripping chain 52. The disk 48 constitutes the female member of the clutch and the chain 52 serves as the male member of the clutch, the said chain being formed of a series of links pivotally connected and completely surrounding the said disk and having a terminal link 53 at one end thereof fitted over or embracing the inner end of a bar 54 standing outwardly therefrom and serving both as a tension regulating or controlling and a coupling means for the said chain.

To insure retention of the link 53 on the inner end of the bar 54, the latter is formed with a groove 55, as clearly shown by Fig. 4. The link 56 at the opposite extremity of the chain embraces the bar 54 at a point outwardly from the inner end of said bar and is diagonally disposed, said link 56 engaging a groove 57 in the bar to maintain positive assemblage thereof with the latter, the grooves 55 and 57 being formed in opposite edges of the bar. A spring 59 is also attached to one of the chain links, as at 58, and connected at its opposite extremity to a link or coupling member 60 movably engaging the bar 54 and also movably attached to the arm 46 at the lower end of the actuating means or oscillating lever 38. For convenience in assembling the link or coupling member 60 with the arm 46 and bar 54, its ends are bent at an angle as shown by Fig. 3 and inserted through openings in the arm and bar. The spring 59 tends to return the chain 52 and the bar 54, after relaxation, to normal position or subsequent to partial rotation of the clutch mechanism, or movement of said clutch to rotate the shaft 35. The connecting link or member 60 transmits motion from the actuating means or lever 38 to the tension or coupling bar 54 and the outward movement of the lower extremity of the said actuating means or lever 38 is transmitted through the link or member 60 to the bar 54 to relax the chain 52, which through the medium of the spring 59 is returned to normal position.

The movement of the oscillating lever or actuating means 38 is regulated as to its stroke or may be increased or diminished to correspondingly increase or decrease the feed of the block without the necessity of changing gears by means of an eccentrically mounted or cam disk 61 fulcrumed as at 62 on the bracket 47 in rear of the said lever or actuating means, the said cam having an operating handle 63 for manual actuation. The edge of the cam or disk 61 and the rear edge of the lower extremity of the actuating means or lever 38 are constantly held in alinement particularly by the bracket 47 which prevents the lower extremity of said actuating means or lever from moving laterally or becoming distorted, or vibrating, and thus a positive adjustment or regulation of the stroke of the actuating means or lever may be readily obtained by rotating the disk or cam 61 and consequently modifying the movement of the link or connecting member 60 and the clutch mechanism. It is evident that when the disk or cam 61 is shifted in one direction the length of the stroke of the lever 38 can be increased, thereby increasing the movement of the clutch and shaft 35, and when the disk or cam 61 is shifted in the opposite direction the length of the stroke of the lever 38 will be decreased and the movement of the clutch and shaft correspondingly diminished.

From the foregoing description the operation of the mechanism will be readily understood. When the shaft 8 is rotated it will cause the cam 37 to intermittently force the upper extremity of the actuating means or lever 38 rearwardly and the lower extremity of said lever will be simultaneously moved forwardly against the resistance of the spring 41 and thus tighten the chain on the clutch disk 48 and operate the latter to impart to the shaft 35 a partial rotation. When the high part of the cam 37 has fully traversed or moved over the upper extremity of the lever or actuating means 38, the spring 41 operates to draw the said lever backwardly in the opposite direction and the chain 52 on the clutch disk is relaxed sufficiently to permit the parts to return to normal position and ready for a subsequent gripping action of the chain relatively to the clutch disk. The movement of the shaft 35 through the actuation of the clutch mechanism explained will, by means of the worms 34 thereon and the worm gears 33 equally operate the spindles 19 and 24 carrying the feed rolls 20 and 25 and regularly feed the block relatively to the scoring and shaving knives or blades, as will be readily understood.

What is claimed is:

1. In an excelsior machine, the combination with cutting devices having a vertical reciprocation and feed rolls provided with means for simultaneously operating the same, of a main driving shaft for vertically reciprocating the cutting devices provided with a cam, an oscillating actuating means having its upper extremity held in loose contact with the cam and its lower extremity connected to the means for simultaneously operating the feed rolls, and a manually operative device to engage the rear edge of the lower extremity of the said oscillating actuating means to modify the stroke of the latter means and of the means for simultaneously operating the feed rolls.

2. In an excelsior machine, the combination with cutting devices having a vertical reciprocation and feed rolls provided with means for simultaneously operating the same, of a main driving shaft for vertically reciprocating the cutting devices provided with a cam, a spring-actuated oscillating means having its upper extremity held in contact with the cam and its lower extremity connected to the means for simultaneously operating the feed rolls, means for preventing lateral movement of the lower extremity of said oscillating means, and an eccentrically mounted manually operative device to engage the rear edge of the lower extremity of the said oscillating means to modify the stroke of the latter means and also of the means for simultaneously operating the feed rolls.

3. In an excelsior machine, the combination with cutting devices having a vertical reciprocation and feed rolls provided with means for simultaneously operating the same, of a main driving shaft for vertically reciprocating the cutting devices provided with a cam, a spring retracted oscillating means having its upper extremity held in contact with the edge of the cam and its lower extremity connected to the means for simultaneously operating the feed rolls, the said oscillating means being continuous from its upper to its lower extremity, and an eccentrically mounted manually operative device to engage the rear edge of the lower extremity of the said oscillating means to modify the stroke of the latter means and also the movement of the means for simultaneously operating the feed rolls.

In testimony whereof we have hereunto set our hands in presence of two subscribing witnesses.

WILLIAM E. SWANGER.
EDWARD P. HUEBER.

Witnesses:
OSCAR P. JOHNSTON,
ROBERT H. RICHARDS.